United States Patent [19]

Kleist

[11] 4,384,908
[45] May 24, 1983

[54] APPARATUS AND METHOD FOR CUTTING, SHOULDERING AND SEALING STRIP WEBBING

[76] Inventor: William E. Kleist, Rte. 29, Salisbury Center, N.Y. 13454

[21] Appl. No.: 371,929

[22] Filed: Apr. 26, 1982

[51] Int. Cl.³ .............................................. B32B 31/18
[52] U.S. Cl. ...................................... 156/88; 156/251; 156/515; 156/530
[58] Field of Search ................. 156/88, 251, 515, 518, 156/530

[56] References Cited

U.S. PATENT DOCUMENTS

| 2,638,963 | 8/1953 | Frederick et al. | 156/515 |
| 3,033,257 | 5/1962 | Weber | 156/515 |
| 3,083,757 | 4/1963 | Kraft et al. | 156/515 |
| 3,257,256 | 6/1966 | Lehmacher et al. | 156/515 |
| 3,367,810 | 2/1968 | Wasserstein | 156/88 |
| 3,413,176 | 11/1968 | Port et al. | 156/88 |
| 3,486,957 | 12/1969 | Fish et al. | 156/88 |
| 3,681,176 | 8/1972 | Reifenhauser et al. | 156/515 |
| 3,687,789 | 8/1972 | Wheeler | 156/515 |
| 3,940,305 | 2/1976 | Stenberg | 156/515 |

FOREIGN PATENT DOCUMENTS 47-46633 11/1972 Japan .

Primary Examiner—Caleb Weston
Attorney, Agent, or Firm—Walter F. Wessendorf, Jr.

[57] ABSTRACT

Disclosed is the apparatus and method for cutting a desired length of strip webbing, and for shouldering and sealing the severed edges of the cut webbing with a non-raveling finished edge. The cutting is effected by the cutting blade on one of two dies constrained to relative translatory movement. Heat and pressure applied by the flat surfaces of the dies shoulders the edges of the cut webbing. A heated lateral groove on a die seals the flashing of the severed edge and results in a non-raveling finished edge.

9 Claims, 13 Drawing Figures

APPARATUS AND METHOD FOR CUTTING, SHOULDERING AND SEALING STRIP WEBBING

BACKGROUND OF THE INVENTION

1. Technical Field

This invention relates to the cutting, shouldering and sealing of strip webbing.

2. Background Art

The prior art, U.S. Pat. No. 3,083,757, relates to a knife sealer for thermoplastic film or sheet; U.S. Pat. No. 3,257,256 relates to a device for welding and cutting thermoplastic webs; U.S. Pat. No. 3,367,810 relates to a method and apparatus for preventing raveling of fabric ribbons along their cut side edges; U.S. Pat. No. 3,486,957 relates to a method and apparatus for cutting and edge-sealing thermoplastic woven fabrics; and Japanese Pat. No. 47-46633 relates to carpet hemming by fusing pile between rollers and slitting.

The problems in the art to which this invention apertains are the needs for an apparatus and method by which a strip webbing (strap) of nylon, polypropylene or other suitable webbing material can be fed longitudinally from a dispenser to the apparatus at which the webbing is cut into its desired length, its severed edges shouldered and sealed with a non-raveling finished edge which is also neat and uniform in appearance. The need for such a finished edge arises from the fact that the webbing is utilized in a host of securing functions, such as with backpacks, seatbelts, etc., and its edge is introduced through a buckle, clamp or other securing device, tightened and secured thereby. Since the edge of conventionally cut webbing is uneven, frayed and subject to unraveling, it is difficult to non-interferingly introduce such an edge through a buckle, clamp or other securing device.

Accordingly, the object of the invention is to contribute to the solution of the discussed problems of the prior art by means of the apparatus and method of this invention by which the webbing can be longitudinally fed for cutting into a desired length, its edges shouldered and sealed with a smoothe and rounded shape constituting a non-raveling finished edge that is neat and uniform in appearance.

SUMMARY OF THE INVENTION

In accordance with the invention, there are provided heated dies whose relative movements are translatory and which cut and shoulder the edges of the webbing fed therebetween. Flashing on the cut and severed edge of the webbing is smoothed-out by applying thereto the heated lateral groove formed in one of the heated dies.

BRIEF DESCRIPTION OF THE DRAWINGS

The object of the invention and other objects of the invention should be discerned and appreciated by reference to the drawings, wherein like reference numerals refer to similar parts throughout the several views, in which.

DESCRIPTION OF THE PREFERRED EMBODIMENT

Figure 1:
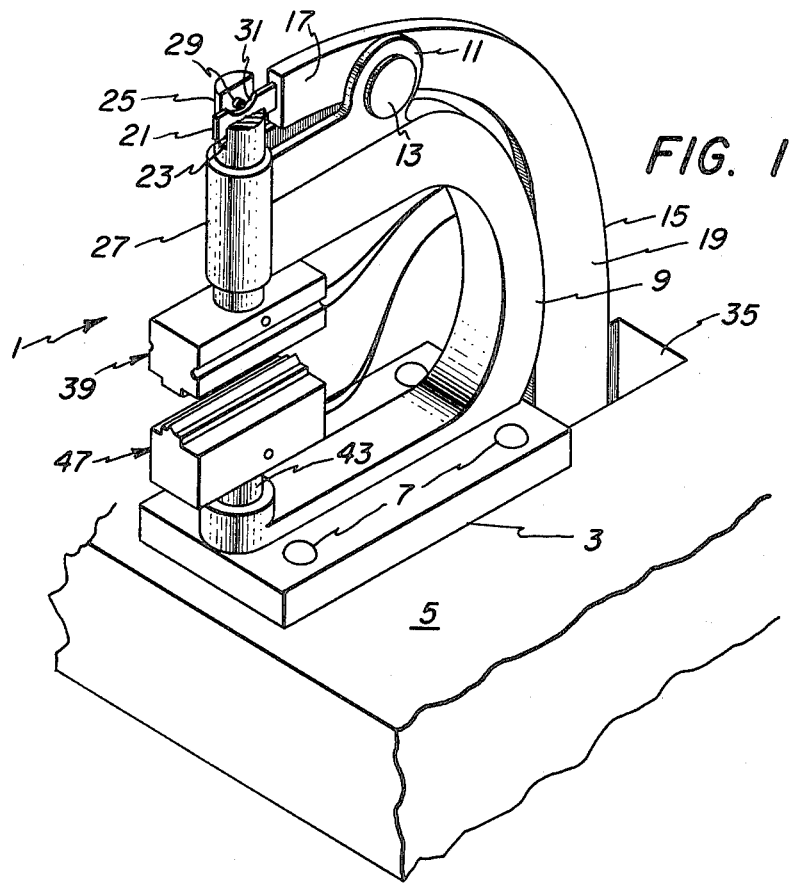
FIG. 1 is an isometric view of the apparatus.

In FIG. 1 of the drawings, reference numeral 1 generally refers to the apparatus of this invention. Apparatus 1 comprises a mounting base 3 in fixed mounting relationship with the work table 5 by means of carriage bolts 7. Mounting base 3 carries in fixed relationship a U-shaped bracket 9. U-shaped bracket 9 has upstanding ears 11 whose aligned holes (not shown) carry a cross pin 13 which pivotally mounts a rocker arm 15. Rocker arm 15 has a small upper arm 17 and a long lower arm 19. The restoring gravity weight component of the long lower arm 19 constrains rocker arm 15 to its inoperative position shown in FIG. 1.

Integral with and transversely projecting from the end of small upper arm 17 is a drive tongue 21 which operatively engages a slot 23 in connecting rod 25 constrained to free up and down movement in a complemental cylindrical body 27 fixed to U-shaped bracket 9. Connecting rod 25 carries a cross pin 29 which rides upon an arcuate portion 31 formed in drive tongue 21 such that, upon rocking movement of rocker arm 15, reciprocating drive movement will be transmitted to connecting rod 25 with cross pin 29 and arcuate portion 31 functioning cooperatively to prevent wedging lock-up of connecting rod 25 within cylindrical body 27.

Suitable depressing foot engagement with the pedal 33 carried on the end of lower arm 19 effects rocking movement of rocker arm 15 with the suitable clearance slot 35 in work table 5 providing clearance for such movement of lower arm 19.

Adjustably mounted on connecting rod 25 by means of a set screw 37 is a heated upper die 39. The U-shaped bracket 9 has integral therewith a cylindrical body 41 which carries a rod 43. Adjustably mounted on rod 43 by means of a set screw 45 is a heated lower cutting die 47. Upper die 39 and lower die 47 have respective cylindrical cavities 49 and 51 which suitably mount and carry electrical resistance heating elements 53 and 55, respectively, that are wired to a control box 57 to control and maintain the temperature range of the heated dies 39 and 47 within the preferred range of 450 to 575 degrees Fahrenheit.

The upper and lower dies 39 and 47 are in aligned and parallel relationship with each other. Drive actuation of rocker arm 15 by depressing pedal 33 transmits translatory motion to the upper die 39 and, accordingly, the relative motion of the upper and lower dies 39 and 47 is maintained in such aligned and parallel relationship.

Figure 2:
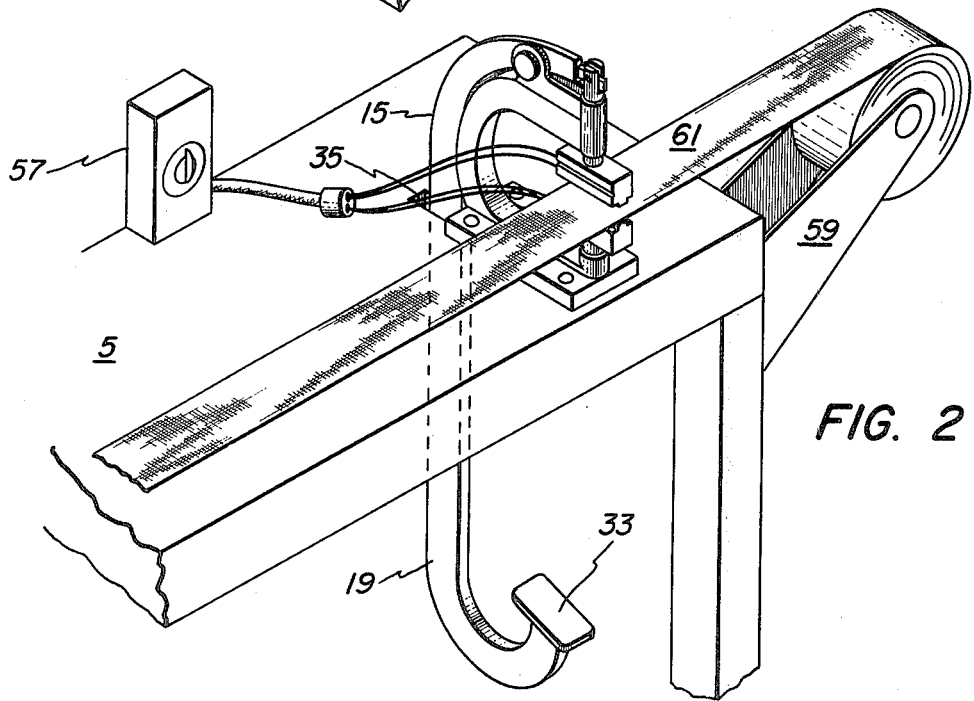
FIG. 2 is an isometric view showing webbing fed to the apparatus.
Figure 3:
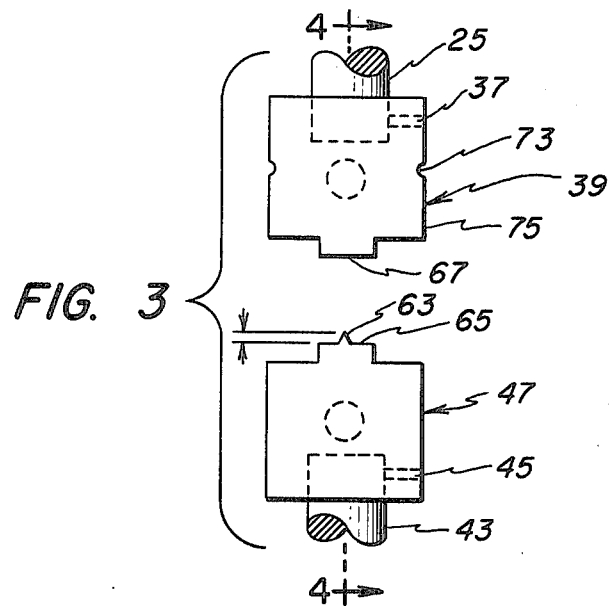
FIG. 3 is a front elevation view showing the shape of the dies.
Figure 4:
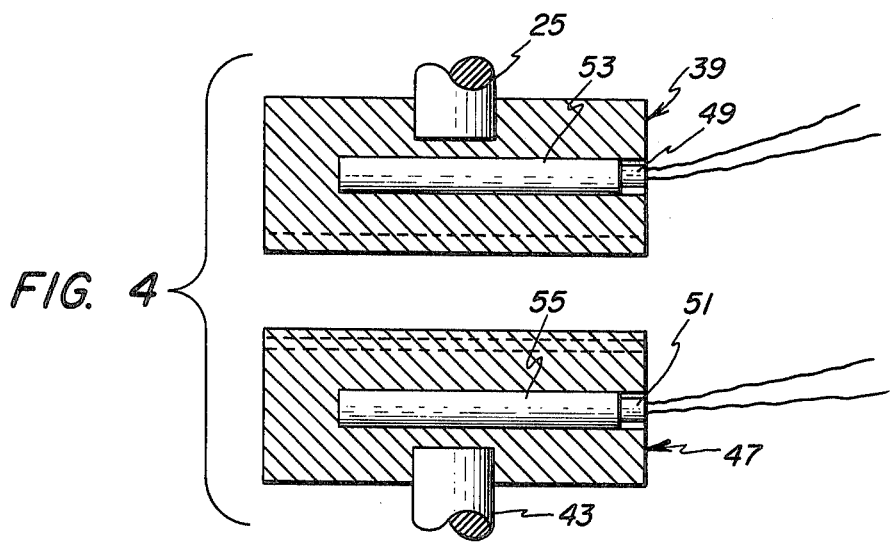
FIG. 4 is a sectional view taken in the direction of the arrows 4-4 in FIG. 3.
Figure 9:
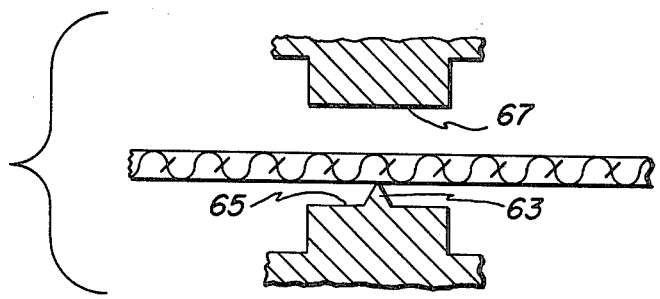
FIG. 9 is a partial front elevation, in section, showing the dies and webbing preparatory to the first step of the cutting operation.
Figure 10:
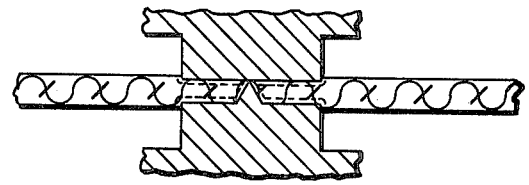
FIG. 10 shows the webbing cut, shouldered and sealed (as indicated by the dotted areas)
Figure 11:
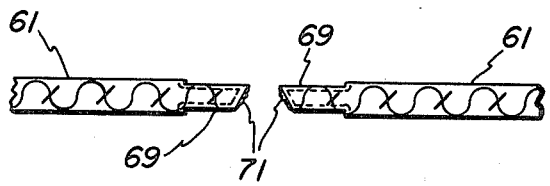
FIG. 11 is a view of the webbing that has been cut, shouldered and sealed.
Figure 12:
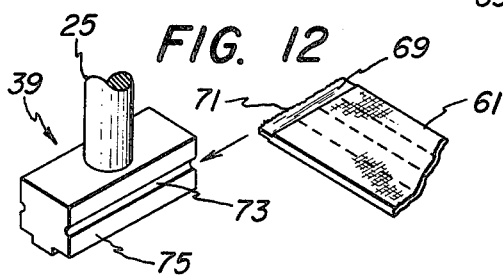
FIG. 12 is an isometric view of the upper die preparatory to introducing and contacting the severed edge of the webbing with the lateral groove to smoothe-out the flashing on the severed edge of the webbing.

A webbing dispenser 59 suitably mounted on the work table 5 dispenses a roll of webbing 61 in a longitudinal direction and in normal relationship to and between the upper and lower dies 39 and 47, as shown in FIGS. 2 and 9. The desired length of webbing 61 is cut by the human operator by simply applying his foot to engage and depress pedal 33 to cause the dies 39 and 47 to close upon the webbing 61, as shown in FIG. 10. The lower die 47 has a cutting blade 63 whose vertical height above the upper flat surface 65 of lower die 47 is less than the thickness of the webbing 61. Accordingly, when the cutting blade 63 engages the lower flat surface 67 of upper die 39, cutting blade 63 functions as a limit stop to prevent further relative closing movement of upper and lower dies 39 and 47. Upon such closing movement of upper and lower dies 39 and 47, cutting blade 63 cuts through and severs the webbing 61, as shown in FIGS. 10 and 11. And since the vertical height of the cutting blade 63 is less than the thickness of the webbing 61, the heated flat surfaces 65 and 67 of the respective lower and upper dies 47 and 39 will cause shoulders 69 to form in the severed webbing, as shown in FIGS. 8 and 10-13. However, flashing 71 remains on the severed edges of the webbing 61, as shown in FIGS. 10-12.

Figure 13:
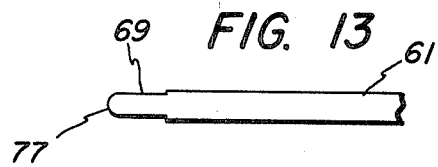
FIG. 13 is a side elevation of the webbing after the "grooving" operation of FIG. 12.

In the next step, the severed edge of the webbing 61 is appropriately disposed and engaged with the heated lateral groove 73 formed in the lateral side 75 of the heated upper die 39 such that groove 73 will seal the flashing 71 and constrain the severed edge of the cut webbing 61 to the resulting smoothe and rounded shape 77, as shown in FIG. 13.

Figure 7:
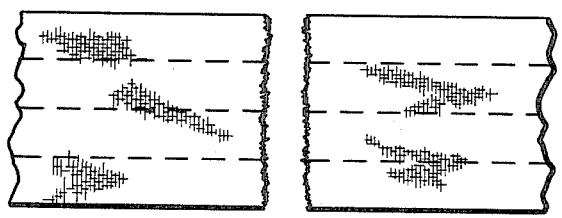
FIG. 7 is a view showing webbing cut and formed in the prior art and depicts the edges as being uneven, frayed and subject to unraveling.
Figure 8:
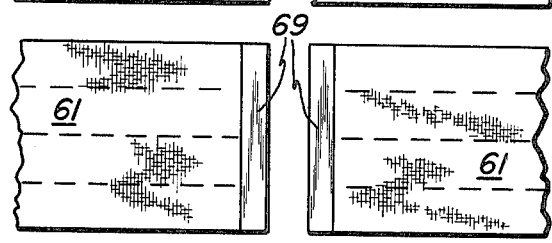
FIG. 8 is a view showing webbing cut, shouldered and formed by this invention with even and bonded edges as a result of heat-sealing of the areas of such webbing in contact with the heated surfaces of the dies.

It should be obvious that the smoothed-out and rounded edge 77 of the cut and severed webbing 61 together with the shoulders 69 formed and sealed thereon is far easier to non-interferingly introduce through a buckle, clamp or other securing device than the uneven and frayed edge of the prior-art webbing shown in FIG. 7 and which is subject to unraveling.

Figure 5:
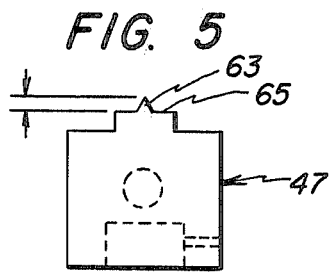
FIG. 5 is a front elevation of the lower cutting die showing a particular webbing thickness that can be spatially accommodated.
Figure 6:
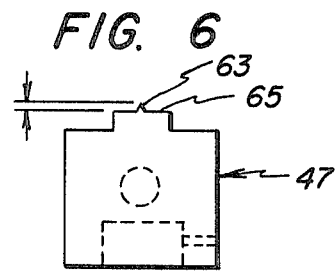
FIG. 6 is a front elevation of another lower cutting die showing the webbing thickness it can spatially accommodate.

FIGS. 5 and 6 show lower cutting dies 47 having cutting blades of different vertical heights to spatially accommodate webbing 61 of different thickness.

When the webbing dispenser 59 is disposed at an angle relative to work table 5, the webbing 61 dispensed will be fed at an angle relative to dies 39 and 47; and, hence, the resulting edges cut, shouldered and sealed will be on the bias at the same angle corresponding to the diagonal feed angle of the dispenser 59 relative to work table 5. Similarly, if longitudinal feed of the webbing 61 from its dispenser 59 is maintained, the mounting base 3 can be disposed and mounted at an angle relative to such longitudinal feed with the result that the edges cut, shouldered and sealed by the dies 39 and 47 will be on the bias at a corresponding angle.

Having thusly described my invention, I claim:

1. An apparatus for cutting cross-cut or on the bias fed woven single-strip webbing into whatever length that may be desired, and for shouldering the upper and lower surfaces of the webbing on both sides of the severed edges of said webbing and sealing said severed edges of the cut webbing with non-raveling finished edges, said apparatus comprising a heated uper die and a heated lower die, said dies being in aligned and parallel relationship with each other, said apparatus having means operative to effect relative translatory movement of said dies, said dies having flat surfaces for shouldering simultaneously said upper and lower surfaces of said webbing on both sides of the severed edges of said webbing, one of said dies having a cutting blade normal to said flat surface of said dies and whose height above said flat surface is less than the thickness of said webbing; and in operation of said apparatus: said cutting blade cutting through the material of said webbing to form two severed edges and said flat surfaces of said dies simultaneously engaging and shouldering both said upper and lower surfaces of said webbing on both of said sides of said severed edges of said webbing.

2. Apparatus in accordance with claim 1, wherein one of said dies has a lateral groove that effects said sealing of said severed edges of said cut webbing with non-raveling finished edges.

3. Apparatus in accordance with claim 1, wherein said dies have a temperature range of 450 to 575 degrees Fahrenheit.

4. The method of cutting cross-cut or on the bias fed woven single-strip webbing to a desired length, and for shouldering the upper and lower surfaces of said webbing on both sides of the severed edges of said webbing and sealing the severed edges of the cut webbing with non-raveling finished edges comprising the steps of feeding or paying out said webbing sufficiently to cut said webbing to the length desired, of simultaneously shouldering said upper and lower surfaces on both sides of the severed edges of said webbing by subjecting said upper and lower surfaces on both sides of the severed edges of said webbing to heat and pressure application in relative translatory relationship and of sealing the severed edges of the cut webbing with non-raveling finished edges by subjecting said severed edges to heat and pressure application.

5. The method of claim 4, wherein said webbing is fed or payed out relative to the desired cross-cut or on the bias cutting step thereafter performed.

6. The method of claim 4, wherein said webbing is fed or payed out at the angle corresponding to the desired cut on the bias cutting step thereafter performed.

7. The method of claim 4, wherein said cutting step is performed cross-cut relative to said webbing to effect cross-cutting of said webbing.

8. The method of claim 4, wherin said cutting step is performed on the bias relative to said webbing to effect cutting of said webbing on the bias.

9. The method of claim 4, wherein the heat applied has a temperature range of 450 to 575 degrees Fahrenheit.

* * * * *